United States Patent [19]

Inoue

[11] Patent Number: 5,015,936
[45] Date of Patent: May 14, 1991

[54] LINEAR DRIVING DEVICE FOR USE OF A COPYING APPARATUS

[75] Inventor: Atsushi Inoue, Nara, Japan

[73] Assignee: Sharp Kabushiki Kaisha, Osaka, Japan

[21] Appl. No.: 442,697

[22] Filed: Nov. 29, 1989

[30] Foreign Application Priority Data

Nov. 30, 1988 [JP] Japan .................................. 63-304359

[51] Int. Cl.$^5$ ........................ G05B 11/00; G03G 15/28
[52] U.S. Cl. ...................................... 318/687; 318/135; 355/235
[58] Field of Search .................................. 318/560–636, 318/135, 687; 310/12–14; 355/235, 8, 14; 358/476

[56] References Cited

U.S. PATENT DOCUMENTS

| | | | |
|---|---|---|---|
| 3,857,075 | 12/1974 | Sawyer | 318/135 X |
| 4,012,676 | 3/1977 | Giebler | 318/687 X |
| 4,476,496 | 10/1984 | Thaler | 358/476 X |
| 4,507,598 | 3/1985 | Wakabayashi et al. | 318/687 |
| 4,509,001 | 4/1985 | Wakabayashi et al. | 318/687 |
| 4,543,615 | 9/1985 | Van Campenhout et al. | 318/135 X |
| 4,585,331 | 4/1986 | Stoffel et al. | 355/235 |
| 4,609,946 | 9/1986 | Thaler | 358/476 X |
| 4,631,432 | 12/1986 | Thaler | 318/135 X |
| 4,667,139 | 5/1987 | Hirai et al. | 318/687 |
| 4,698,575 | 10/1987 | Bouwer | 318/135 X |
| 4,706,129 | 11/1987 | Yamada | 318/135 X |
| 4,714,400 | 12/1987 | Barnett et al. | 318/687 X |
| 4,772,837 | 9/1988 | MacMunn | 318/687 |
| 4,883,994 | 11/1989 | Nikura | 318/135 |
| 4,922,142 | 5/1990 | Givler et al. | 318/135 |

Primary Examiner—Paul Ip

[57] ABSTRACT

A linear driving device is used for example in a copying apparatus. The linear driving device has a first and second linear driving section. The sections can displace a drum projection optical mechanism and an original document scanning optical mechanism from respective initial positions alternately in an original document scanning direction. A driving control section imparts a speed pattern for the drum projection optical mechanism and the original document scanning optical mechanism so that a speed ratio is at 2 to 1. The control section also controls the first and second linear driving sections according to the speed pattern. There is an initial position adjusting section for independently controlling the respective first and second linear driving sections according to external instructions, apart from the control to be effected by the driving control section. The initial position adjustment section compensates for errors caused during assembly or wear in order to keep an optical path constant.

3 Claims, 5 Drawing Sheets

5,015,936

LINEAR DRIVING DEVICE FOR USE OF A COPYING APPARATUS

BACKGROUND OF THE INVENTION

The present invention generally relates to a driving apparatus and more particularly, to a linear driving arrangement to be used in a copying apparatus or the like for alternately displacing optical mechanisms incorporated in the copying apparatus.

In copying apparatuses of an electrophotographic system, that have a fixed or stationary original document platform are required to make constant, a light path length from surface of an original document to the photosensitive surface of a photoreceptor drum, irrespective of the scanning positions thereof, and therefore, such a copying apparatus is normally provided with a linear driving arrangement. The linear driving arrangement displaces a drum projection optical mechanism and an original document scanning optical mechanism at a speed ratio of 2 to 1 in a scanning direction of the original document (Such a linear driving arrangement for the copying apparatus will be merely referred to as the linear driving arrangement).

A conventional linear driving apparatus will be briefly described with reference to FIG. 5.

In the known linear driving apparatus as shown in FIG. 5, a drum projection optical mechanism DP and an original document scanning optical mechanism OS are coupled to each other through a wire/pulley mechanism F. Mechanism F includes a steel wire W passed around pulleys P1, P2 and P3 and a shaft of a driving motor. The speed is controlled so that the speed ratio thereof becomes to be 2 to 1, while the drum projection optical mechanism DP and the original document scanning optical mechanism OS are further arranged to be displaced at predetermined speed patterns by controlling driving of the motor M connected to said wire/pulley mechanism F.

However, the conventional linear driving apparatus as referred to above has disadvantages. The drum projection optical mechanism DP and the original document scanning optical mechanism OS be connected to and restricted by the steel wire W of the wire/pulley mechanism F, when a variation arising from assembling errors, etc. takes place in an optical path length, positional adjustments for the mechanisms DP and OS can not be readily effected. A very high accuracy is therefore required in the assembly. Similarly, even in the case where a variation with time due to expansion and contraction of the steel wire W, etc. takes place besides the variation by the assembling errors referred to above, it becomes very difficult to make adjustments for bringing an image to be copied into focus. The inconveniences as described above become a serious obstacle for the improvement in the performance of a copying apparatus.

SUMMARY OF THE INVENTION

Accordingly, an essential object of the present invention is to provide a linear driving arrangement for use in a copying apparatus and the like, which is capable of readily effecting positional adjustments of a drum projection optical mechanism and an original document scanning optical mechanism employed therein.

Another object of the present invention is to provide a linear driving arrangement of the above described type which is simple in construction and stable in functioning, and can be readily incorporated into a copying apparatus and the like at low cost.

In accomplishing these and other objects, according to one preferred embodiment of the present invention, there is provided a linear driving arrangement for use in a copying apparatus and the like. The linear driving arrangement includes first and second linear driving sections adapted to displace a drum projection optical mechanism and an original document scanning optical mechanism from respective initial positions alternately in an original document scanning direction. There in a driving control section which imparts speed pattern for the drum projection optical mechanism and the original document scanning optical mechanism whose speed ratio is at 2 to 1. The control section and controls said first and second linear driving sections according to the speed pattern, and an initial position adjusting section for independently controlling the respective first and second linear driving sections according to external instructions, apart from the control to be effected by said driving control section.

In the above arrangement according to the present invention, when information related to the positional deviation of the drum projection optical mechanism and the original document scanning optical mechanism is applied to the initial position adjusting section as an instruction from outside, the first and second linear driving sections are independently driven according to said instruction. Accordingly, respective initial positions for the drum projection optical mechanism and the original document scanning optical mechanism are adjusted. When the driving control section is actuated after the adjustments of the drum projection optical mechanism and the original document scanning optical mechanism have been effected, these mechanisms are displaced according to the speed pattern.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
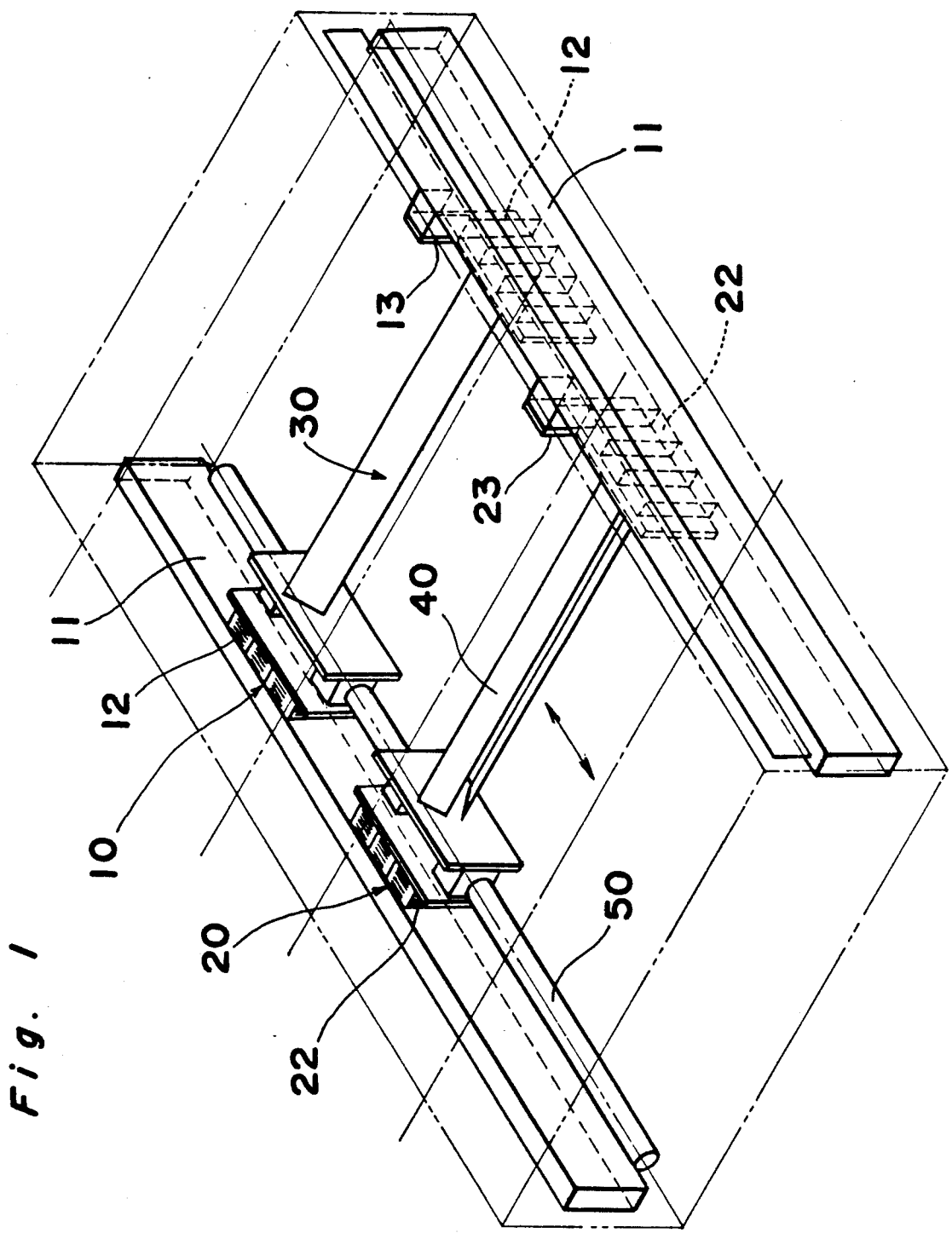
FIG. 1 is a perspective view showing a general construction of a linear driving arrangement according to one preferred embodiment of the present invention.

Before the description of the present invention proceeds, it is to be noted that like parts are designated by like reference numerals throughout the accompanying drawings.

Referring now to the drawings, there is shown in FIG. 1, a general construction of a linear driving arrangement according to one preferred embodiment of the present invention.

In the first place, general constructions of linear motors 10 and 20 for displacing a drum projection optical mechanism 30 and an original document scanning optical mechanism 40 provided within a copying apparatus, will be described with reference to FIG. 1.

The linear motor 10 equivalent to a first linear driving section is constituted by movable members 12 and 12 respectively disposed at opposite sides of the drum projection optical mechanism 30, and stators 11 and 11 perpendicularly disposed to confront the corresponding movable members 12 and 12 as shown, and by restricting sliding movement of the movable members 12 and 12 with a rod-like guide member 50 disposed along the stator 11 at one side to extend therethrough, the drum projection optical mechanism 30 is adapted to be displaced in an original document scanning direction. Similarly, with respect to the linear motor 20 equivalent to the second linear driving section, movable members 22 are respectively disposed at opposite sides of the original document scanning optical mechanism 40, with the stators 11 and 11 and the guide member 50 extending therethrough being commonly used therefor also so as to displace said mechanism 40 in the similar manner as in the linear motor 10. Thus, it is so arranged to displace the drum projection optical mechanism 30 and the original document scanning optical mechanism 40 at a speed ratio of 2 to 1 by independently controlling the linear motors 10 and 20. Moreover, encoders 13 and 23 are respectively provided on the linear motors 10 and 20 for detecting respective displaced positions of the drum projection optical mechanism 30 and the original document scanning optical mechanism 40. Although not particularly shown, at a central portion of each of the movable members 12 and 22, a hall effect element (not particularly shown here) is provided to detect the magnetic pole of the confronting stator 11.

Figure 2:
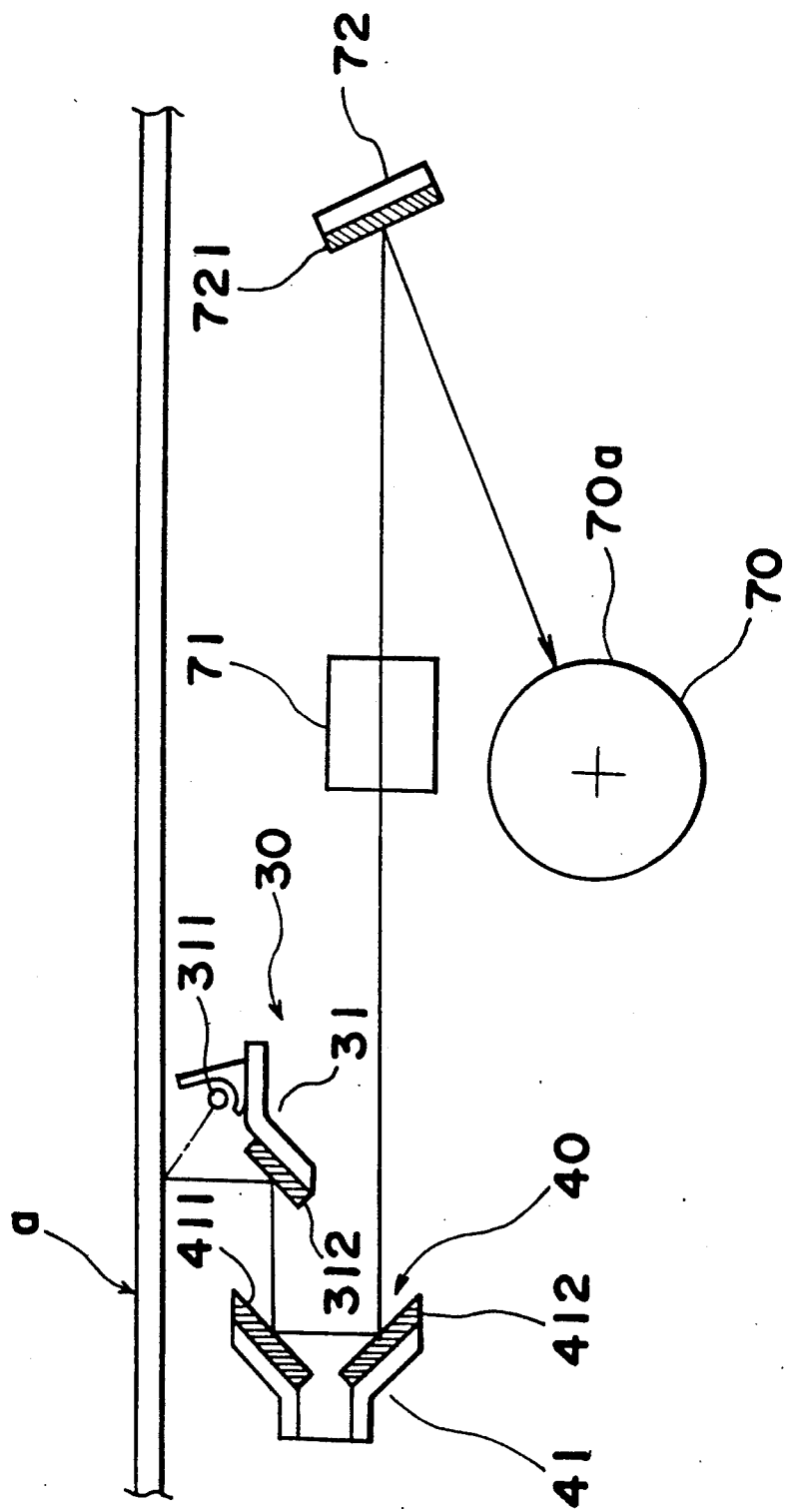
FIG. 2 is a schematic side sectional view showing a drum projection optical mechanism and an original document scanning optical mechanism to be driven by the arrangement of FIG. 1.

Subsequently, referring to FIG. 2, general constructions of the drum projection optical mechanism 30 and the original document scanning optical mechanism 40 will be described.

For the drum projection optical mechanism 30, there may be employed, for example, a mirror base 31 provided with a halogen lamp 311 and a reflecting mirror 312 thereon, while for the original document scanning optical mechanism 40, for example, another mirror base 41 provided with reflecting mirrors 411 and 412 may be adopted. Moreover, in positions which are out of contact with the optical mechanism 30 to be displaced in the original document scanning direction, there are fixedly provided a zoom lens assembly 71, and a mirror base 72 provided with a reflecting mirror 721, etc.

More specifically, it is so arranged that light emitted from the halogen lamp 311 and reflected by the surface of an original document "a" is adapted to be projected onto a photosensitive surface 70a of a photoreceptor drum 70 successively through the reflecting mirrors 312, 411 and 412, and the zoom lens assembly 71, and the reflecting mirror 721, and owing to the arrangement that the speed ratio between the drum projection optical mechanism 30 and the original document scanning optical mechanism 40 is maintained at 2 to 1, an optical path length from the surface of the original document "a" to the surface 70a of the photoreceptor drum 70 can be held constant irrespective of the scanning positions.

Figure 3:
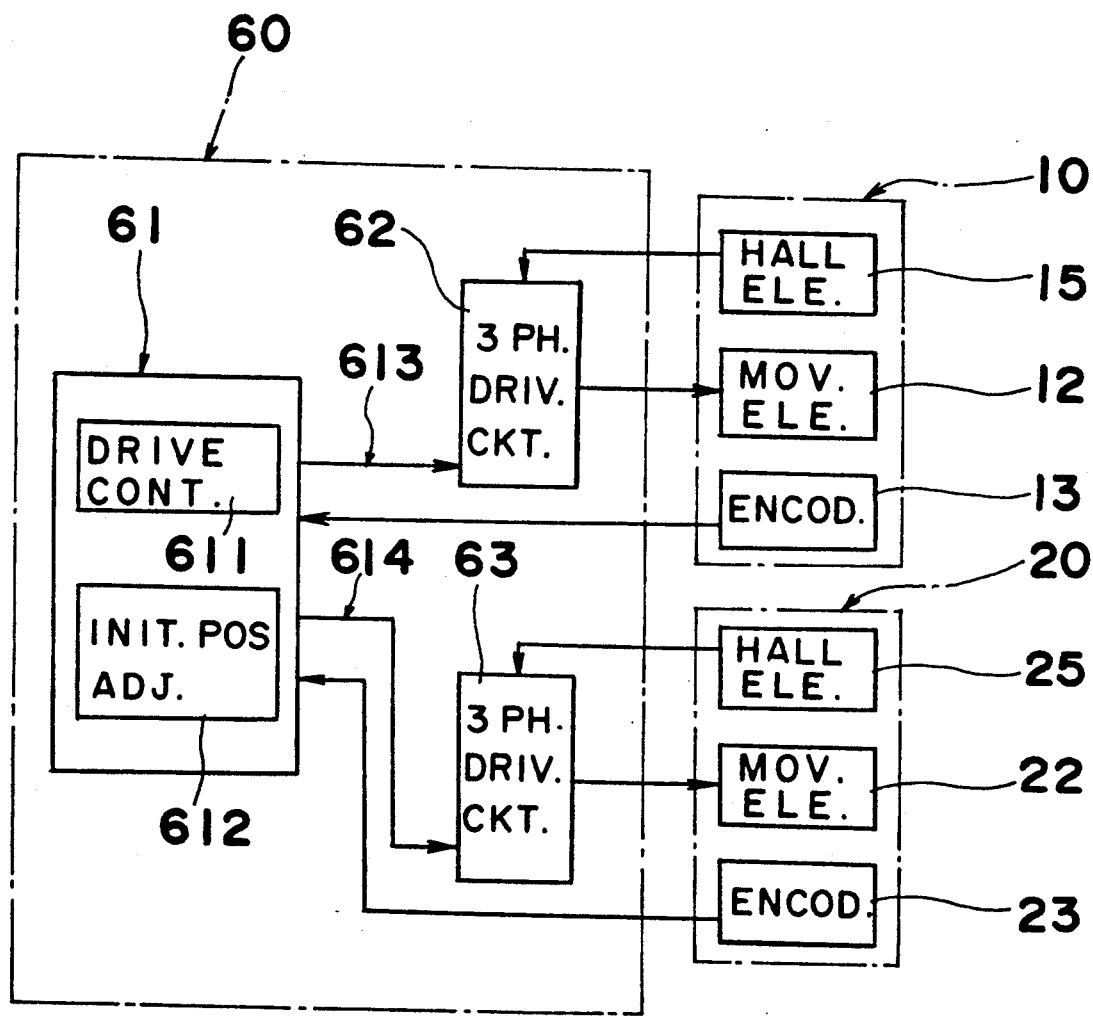
FIG. 3 is an electrical block diagram showing a circuit construction of the linear driving arrangement of FIG. 1.

Hereinbelow, a linear motor control circuit 60 for controlling the linear motors 10 and 20 will be described with reference to FIG. 3.

The linear motor control circuit 60 mainly includes a micro-computer 61, i.e. so-called software servo, and is arranged to produce three-phase exciting current to be applied to the movable members 12 and 22 of the linear motors 10 and 20 so as to displace the drum projection optical mechanism 30 and the original document scanning optical mechanism 40 according to the predetermined patterns.

More specifically, data for respective displaced positions of the drum projection optical mechanism 30 and the original document scanning optical mechanism 40 are successively introduced, through encoders 13 and 23 of the linear motors 10 and 20 connected thereto, into the microcomputer 61, where said data are compared with the speed pattern data preliminarily stored therein, and PWM (Pulse Width Modulation) signals 613 and 614 are produced according to the result of the comparison. The PWM signals 613 and 614 are respectively applied to three-phase driver circuits 62 and 63 which are coupled with the hall effect elements 15 and 25 of the movable members 12 and 22 to receive signals therefrom, while said three-phase driver circuits 62 and 63 produce three-phase exciting current for subjecting the movable members 12 and 22 to the three-phase excitation.

The micro-computer 61 also includes an initial position adjusting section 612 having the function for respectively adjusting the initial positions of the drum projection optical mechanism 30 and the original document scanning optical mechanism 40, in addition to a driving control section 611 having the function to control the linear motors 10 and 20.

Subsequently, by way of example, one program related to the initial position adjusting section 612 in the programs preliminarily stored in the micro-computer 61 will be described with reference to FIG. 4.

Figure 4:
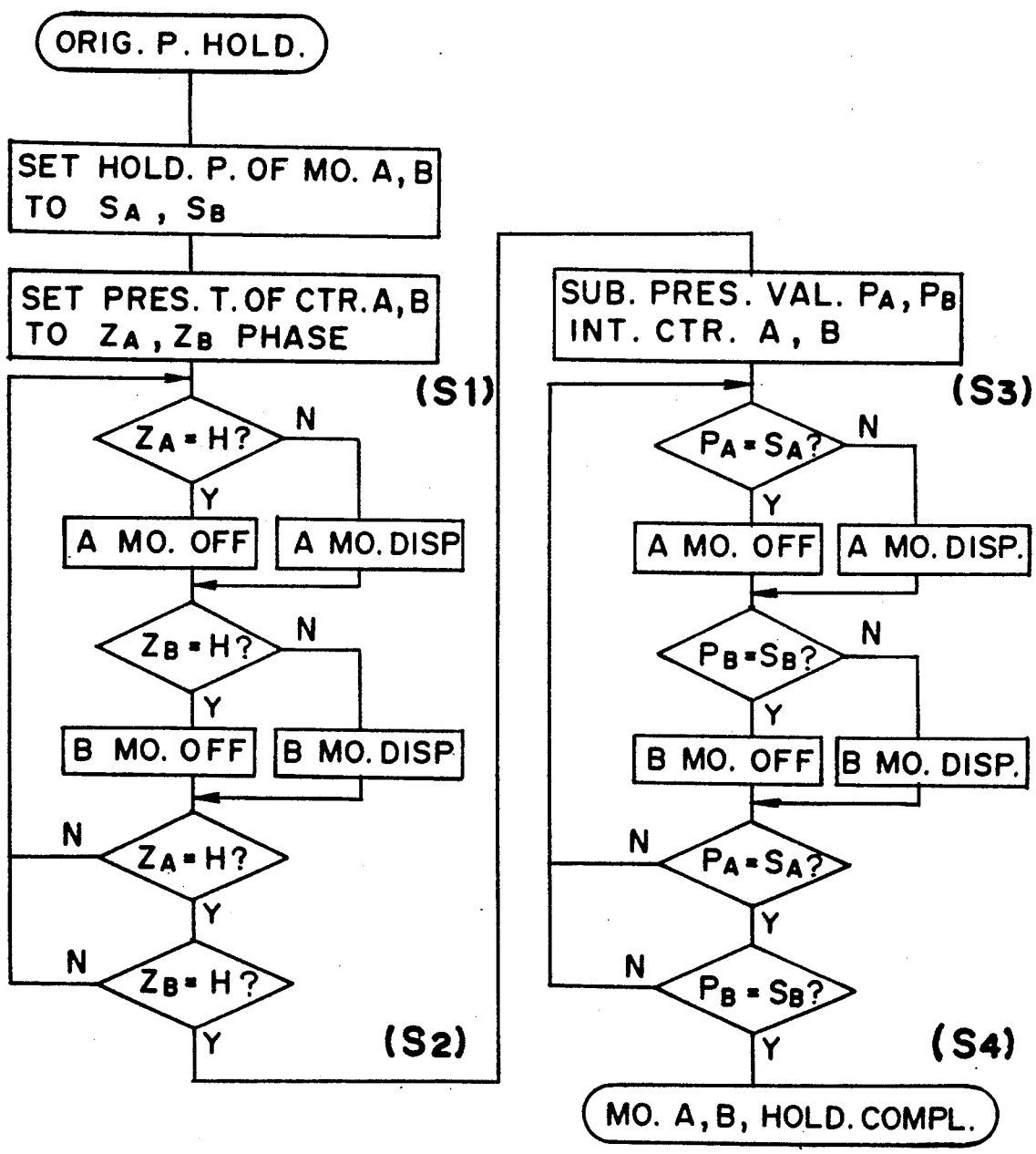
FIG. 4 is a flow-chart for a program related to an initial position adjusting section of a microcomputer.
Figure 5:
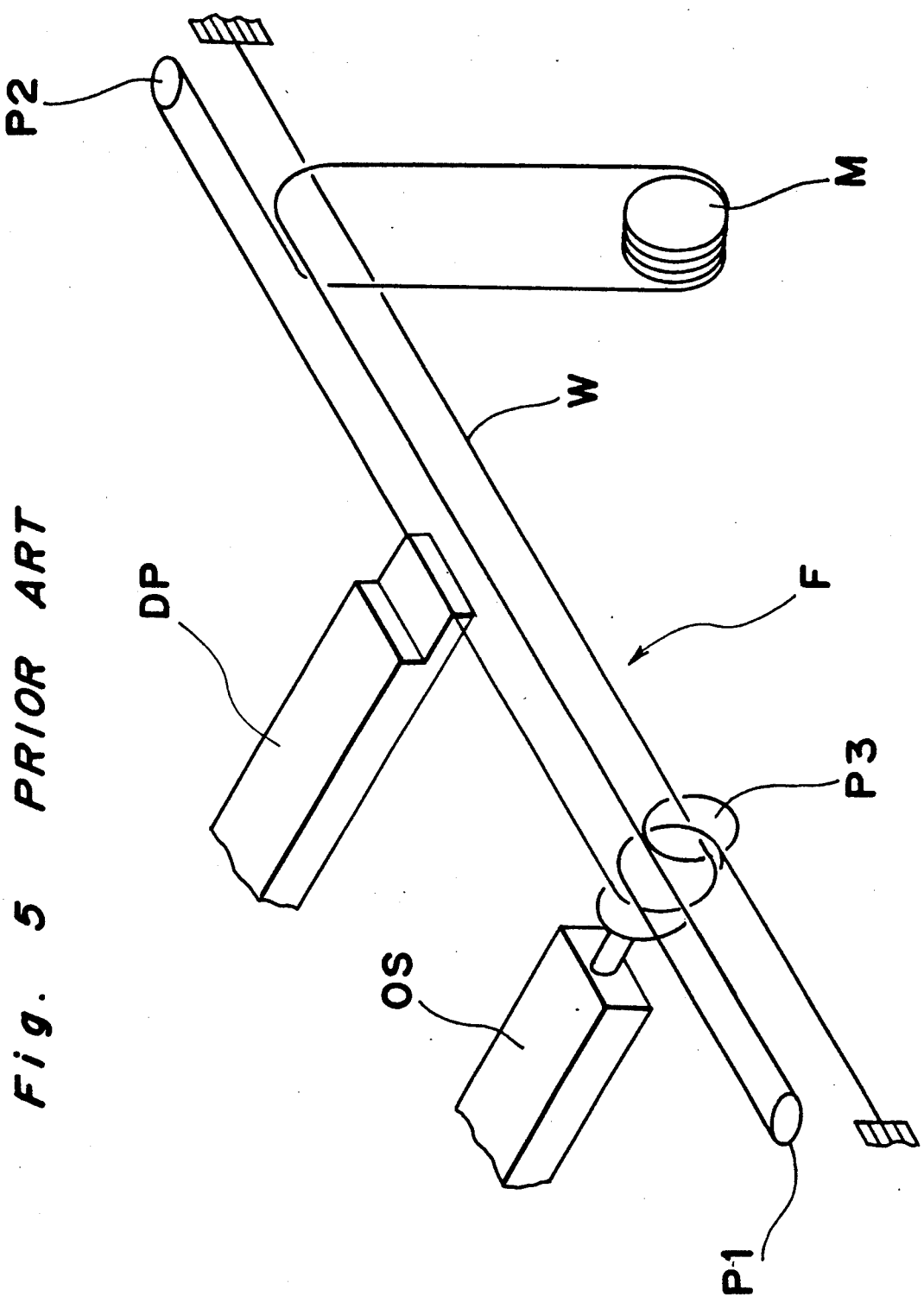
FIG. 5 is a fragmentary perspective view showing a general construction of a conventional linear driving apparatus (already referred to).

It is to be noted here that, in FIG. 4, the linear motor 10 is represented as a motor A, while the linear motor 20 is denoted as a motor B for the convenience of explanation.

In the first place, the linear motors 10 and 20 are respectively driven until count data SA and SB of the counters A and B which give the respective displaced positions of the drum projection optical mechanism 30 and the original document scanning optical system 40, i.e. the respective displaced positions of the linear motors 10 and 20, become equal to the preliminarily set hold-position data for the linear motors 10 and 20, and thus, the optical mechanisms 30 and 40 are respectively returned to the initial positions. Subsequently, initial setting is effected so that counters A and B are respectively preset at such timing that ZA phase of the encoder 13 and ZB phase of the encoder 23 become active (Step S1).

Then, after driving the linear motor 10 until ZA phase of the encoder 13 becomes active, the linear motor 20 is driven until ZB phase of the encoder 23 becomes active (Step S2).

Thereafter, position adjusting data PA and PB related to the displacing amounts required for positional adjustments of the optical mechanisms 30 and 40 from the initial positions thereof are stored in a predetermined register (Step S3). It is to be noted that these position adjusting data PA and PB are arranged to be respectively set through switches or the like (not shown) connected to input ports of said micro-computer 61.

Subsequently, the linear motor 10 is driven until the count data SA and the position adjusting data PA become equal to each other, and thereafter, the linear motor 20 is driven until the count data SB and the position adjusting data PB become equal to each other. Thus, the optical mechanisms 30 and 40 are to be respectively positionally adjusted by the displacing amounts corresponding to the position adjusting data PA and PB (Step S4).

Accordingly, in the linear driving arrangement of the embodiment according to the present invention as described so far, even when the positional relation between the drum projection optical mechanism 30 and the original document scanning optical mechanism 40 is deviated due to assembling errors, variation with time etc., thus resulting in the variation of the optical path length, correction may be readily effected by merely setting the position adjusting data PA and PB from outside. Therefore, not only clear and definite images may be obtained, but a high assembling accuracy is not particularly required for the manufacture of the arrangement. Moreover, owing to the construction which employs the linear motors, the arrangement can be applied to operations at higher speeds, thus contributing to improvement of performance in the copying apparatus on the whole.

It should be noted here that the concept of the present invention is not limited in its application, to the foregoing embodiment alone, but may be applied, for example, to such a modification, in which two units of wire/pulley mechanisms, etc., are employed for the first and second linear driving sections so as to independently displace the drum projecting optical mechanism and the original document scanning optical mechanism in the original document scanning direction.

As is clear from the foregoing description, according to the linear driving arrangement of the present invention, since it is so arranged that the first and second linear driving sections can be independently driven by external instructions, even when deviation or variation is taking place due to assembling errors or variation with time, etc., respective positional adjustments for the optical mechanisms may be readily effected for correction of the optical path length to a proper value, which is very significant for improving the performance of the copying apparatus on the whole.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A linear driving arrangement for use in a copying apparatus comprising:
    first and second linear driving sections for displacing a drum projection optical mechanism and an original document scanning optical mechanism from respective initial positions alternately in an original document scanning direction;
    a driving control section for imparting a speed pattern for said drum projection optical mechanism and said original document scanning optical mechanism in a ratio of 1 to 1, and further for controlling said first and second linear driving sections according to the speed pattern; and
    an initial position adjusting section for independently controlling the respective first and second linear driving sections according to external instructions, separately from the control performed by the said driving control section.

2. A linear driving arrangement as claimed in claim 1, wherein said first and second linear driving section includes linear motors.

3. A linear driving arrangement as claimed in claim 1, wherein said first and second linear driving sections include two sets of wire/pulley driving mechanisms for displacing said drum projection optical mechanism and said original document scanning optical mechanism independently in the original document scanning direction.

* * * * *